US012803327B2

(12) United States Patent
Chi et al.

(10) Patent No.: US 12,803,327 B2
(45) Date of Patent: Nov. 17, 2026

(54) ENERGY HARVEST TRIGGER

(71) Applicant: Dell Products L.P., Round Rock, TX (US)

(72) Inventors: Wei-Hsiang Chi, Taipei (TW); Gerald Rene Pelissier, Mendham, NJ (US); Hsu-Feng Lee, Taipei City (TW); Yi Ming Chou, Taipei City (TW)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 18/354,585

(22) Filed: Jul. 18, 2023

(65) Prior Publication Data

US 2025/0030271 A1 Jan. 23, 2025

(51) Int. Cl.

| | |
|---|---|
| ***A63F 13/24*** | (2014.01) |
| ***A63F 13/235*** | (2014.01) |
| ***H01F 27/28*** | (2006.01) |
| ***H02J 50/00*** | (2016.01) |
| ***H02J 50/10*** | (2016.01) |

(52) U.S. Cl.

CPC .......... *H02J 50/001* (2020.01); *A63F 13/235* (2014.09); *A63F 13/24* (2014.09); *H01F 27/2823* (2013.01); *H02J 50/10* (2016.02)

(58) Field of Classification Search

None

See application file for complete search history.

(56) References Cited

U.S. PATENT DOCUMENTS

| | | | | |
|---|---|---|---|---|
| 5,838,138 | A * | 11/1998 | Henty | G06F 3/0338 320/135 |
| 9,143,060 | B2 * | 9/2015 | Tseng | H02K 35/02 |
| 2010/0020014 | A1 * | 1/2010 | Lin | G06F 3/0383 345/163 |
| 2010/0060234 | A1 * | 3/2010 | Nacson | H02J 7/32 310/75 R |
| 2013/0267321 | A1 * | 10/2013 | Burgess | A63F 13/24 463/37 |
| 2015/0057079 | A1 * | 2/2015 | Fujino | A63F 13/24 463/31 |
| 2016/0325117 | A1 * | 11/2016 | Arai | G21K 1/046 |
| 2016/0325177 | A1 * | 11/2016 | Antonio | A63F 13/24 |
| 2016/0361639 | A1 * | 12/2016 | Schmitz | A63F 13/24 |
| 2019/0038969 | A1 * | 2/2019 | Schmitz | A63H 18/00 |

(Continued)

FOREIGN PATENT DOCUMENTS

| | | | | |
|---|---|---|---|---|
| AU | 2019100491 | A4 * | 6/2019 | G06F 3/0346 |
| WO | WO-2023214929 | A1 * | 11/2023 | A63F 13/24 |

*Primary Examiner* — Tramar Harper

(74) *Attorney, Agent, or Firm* — Norton Rose Fulbright US LLP

(57) ABSTRACT

According to some aspects of this disclosure, an energy-harvesting button for a wireless gaming controller is disclosed. Such an apparatus may include a casing comprising a wire coil having a radius of a first value; a button frame comprising a magnet having a radius of a second value smaller than the first value; and a hinge attaching the button frame to the casing such that the magnet moves at least partially within the wire coil. The hinge is configured to move the magnet along an arc defined by the hinge, wherein the arc includes at least a first portion that extends within the wire coil and a second portion that extends outside the wire coil. Additional aspects and details are also disclosed.

13 Claims, 5 Drawing Sheets

(56) References Cited

U.S. PATENT DOCUMENTS

| | | | | |
|---|---|---|---|---|
| 2021/0093950 | A1* | 4/2021 | Duncan | G06F 3/0202 |
| 2022/0347560 | A1* | 11/2022 | Li | A63F 13/98 |
| 2023/0197323 | A1* | 6/2023 | Valverde | H01F 13/003<br>335/284 |
| 2025/0117061 | A1* | 4/2025 | Goh | G06F 3/03543 |

* cited by examiner

ENERGY HARVEST TRIGGER

FIELD OF THE DISCLOSURE

The instant disclosure relates to user input devices. More specifically, portions of this disclosure relate to a power saving mechanism for user input devices or peripheral devices associated with an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include computing devices that execute video game applications. For example, a desktop computer, a laptop computer, a tablet, a mobile device, a server, or a gaming console may execute a video game application. Video game applications include single-user video games and multi-user video games (e.g., where multiple players compete or cooperate with one another), as well as virtual reality (VR) video games, augmented reality (AR) video games, and other types of video games.

During gameplay, a user may provide input to an information handling system via a user input device, such as a game controller. Some user input devices may include advanced features to simulate certain conditions associated with a virtual gaming environment. However, such features may have high energy requirements that can significantly reduce the controller's battery life. Even without such features, using the game controller for playing games in general can consume a large amount of power over a gameplay session. A game controller with a low battery level that requires a battery replacement or recharge during a gameplay session can significantly hamper or ruin a user's gaming experience.

SUMMARY

Gaming experiences are improved by wireless controllers that allow users to spread out around an entertainment device and/or move between environments (e.g., room to room) in a dynamic gaming environment. However, the nature of wireless devices is a requirement for a mobile energy source. In many devices, the mobile energy source is a battery that must be charged frequently. If the mobile energy source depletes during gameplay the user is unable to continue playing the game. Recharging a wireless controller can take an hour or more, which leaves the user out of the game for a long duration. A user may own multiple batteries to switch in and out of the wireless controller, but remembering to separately charge each of the batteries is a frustrating experience.

Use of a wireless controller for gaming applications or other application is improved through the use of self-charging of the wireless controller. The user's input to the wireless controller may be used to charge the wireless controller. For example, the force applied by the user to the wireless controller to activate buttons, move joysticks, or perform other actions may be used to charge the wireless controller. With the button as an example, the button may be configured with hardware to harvest energy from the user's application of the buttons to generate an electric charging current. Even if a full battery charge is not achieved by harvesting the user's input, the electric charging current may extend the life of the battery, thereby increasing gaming time and improving the user experience.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

According to one embodiment, a method for energy harvesting at a wireless controller includes receiving a user-applied force to a user-activated button that causes a magnet attached to a button frame to move at least partially within a wire coil of a casing of the user-activated button to cause generation of an electric current in the wire coil; and storing energy in an energy storage device based on the electric current in the wire coil.

According to some embodiments, an apparatus for energy harvesting includes a casing comprising a wire coil having a radius of a first value; a button frame comprising a magnet having a radius of a second value smaller than the first value; and a hinge attaching the button frame to the casing such that the magnet moves at least partially within the wire coil. An energy-harvesting button may be incorporated into a wireless gaming controller. According to some embodiments, such a controller includes a controller casing comprising an opening; and the user-activated button extending through the opening.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Gaming experiences are improved by wireless controllers that allow users to spread out around an entertainment device and/or move between environments (e.g., room to room) in a dynamic gaming environment. However, the nature of wireless devices is a requirement for a mobile energy source. In many devices, the mobile energy source is a battery that must be charged frequently. If the mobile energy source depletes during gameplay the user is unable to continue playing the game. Recharging a wireless controller can take an hour or more, which leaves the user out of the game for a long duration. A user may own multiple batteries to switch in and out of the wireless controller, but remembering to separately charge each of the batteries is a frustrating experience.

Use of a wireless controller for gaming applications or other application is improved through the use of self-charging of the wireless controller. The user's input to the wireless controller may be used to charge the wireless controller. For example, the force applied by the user to the wireless controller to activate buttons, move joysticks, or perform other actions may be used to charge the wireless controller. With the button as an example, the button may be configured with hardware to harvest energy from the user's application of the buttons to generate an electric charging current. Even if a full battery charge is not achieved by harvesting the user's input, the electric charging current may extend the life of the battery, thereby increasing gaming time and improving the user experience.

Figure 1:
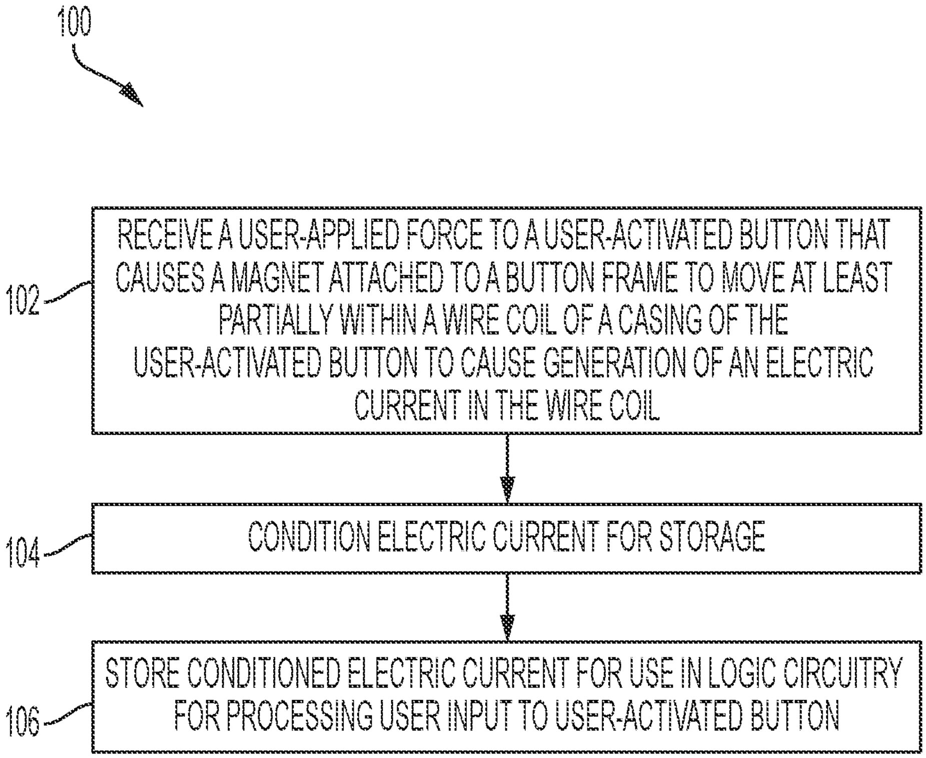
FIG. 1 is a flow chart of an example method for energy harvesting via a trigger of a gaming controller according to some embodiments of the disclosure.

An example for operating a gaming controller with longer battery life is shown in FIG. 1. FIG. 1 is a flow chart of an example method for energy harvesting via a trigger of a gaming controller according to some embodiments of the disclosure. At block 102, the method includes receiving a user-applied force and converting the applied force to an electric current. In one example a user-activated button may causes a magnet attached to a button frame to move at least partially in and out of a wire coil in the path of the magnet. The wire coil may be attached to a casing of the user-activated button. The movement of the magnet in the wire coil causes generation of an electric current in the wire coil.

The electric current generated in the wire coil is then conditioned and stored. At block 104, the electric current may be passed through conditioning circuitry to prepare the electric current for charging an energy storage device. The conditioning circuitry may include one or more of a rectifier, a diode, a DC-DC converter, a battery management circuit, and/or a power management integrated circuit (PMIC). At block 106, the electric charging current is passed, for storage, to an energy storage device. The energy storage device may be, for example, a battery (e.g., a Lithium ion battery) or a supercapacitor.

Figure 2:
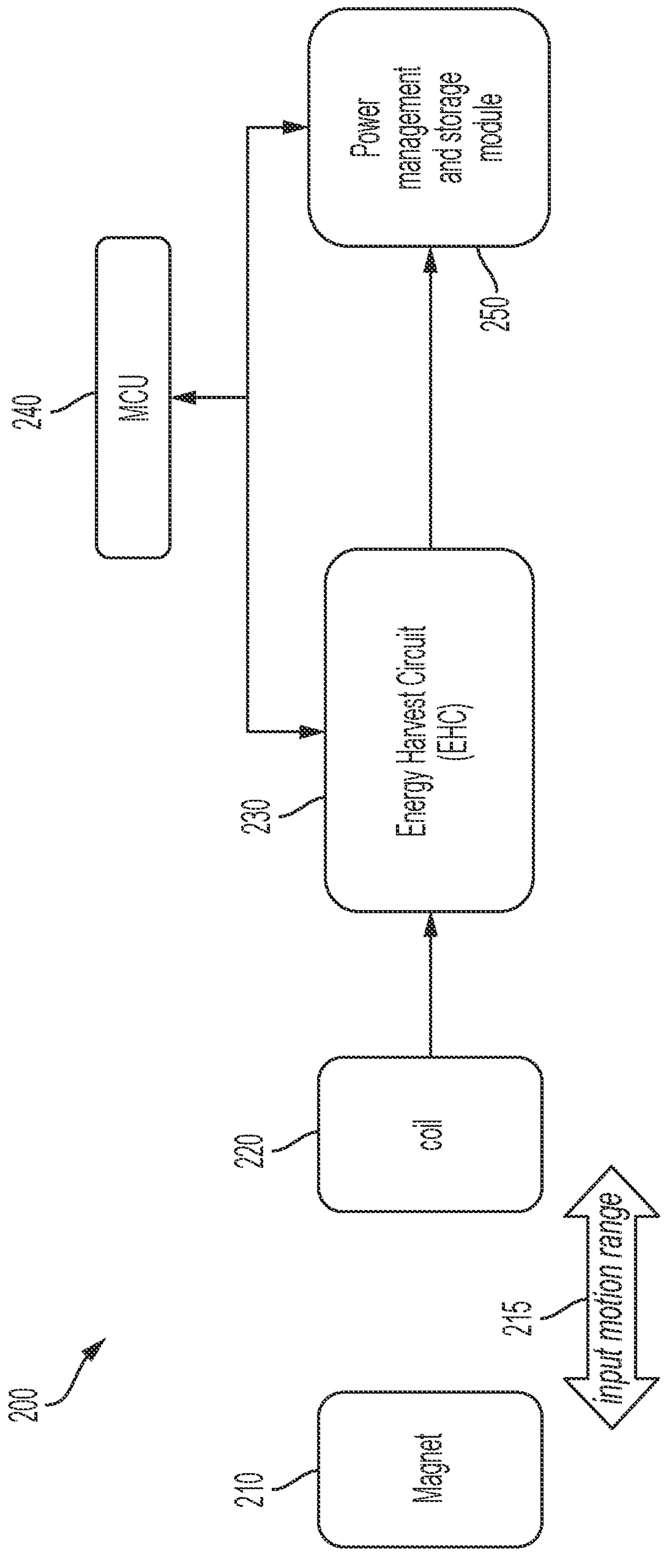
FIG. 2 is a block diagram of a system for an energy harvest trigger according to some embodiments of the disclosure.

FIG. 2 is a block diagram of a system for an energy harvest trigger according to some embodiments of the disclosure. A system 200 includes a magnet 210 and a coil 210. A force applied to a button attached to the magnet 210 may allow the magnet to move through an input motion range 215 towards the coil 220. The electromagnetic field of the magnet 210 creates an electric current in the coil 220. The coil 220 is coupled to an energy harvest circuit (EHC) 230, which may include conditioning circuitry. The EHC 230 is coupled to power management and storage module 250, which may include a battery or capacitor. The power management and storage module 250 is coupled to a microcontroller unit 240, which is logic circuitry that controls operation of the gaming controller. For example, the MCU 240 may include logic circuitry for determining user input through the buttons and other devices on the gaming controller and transmits the user input to a remote device, such as an information handling system (of which one example is a gaming hub device). In one example, the MCU 240 may be coupled to a pressure-sensitive switch activated by the same button that has the magnet 210 attached. In such a configuration, depressing the button causes the magnet 210 to interact with the coil 220 and also causes a part of the button to depress a pressure-sensitive switch. The depressing of the pressure-sensitive switch may be interpreted by the MCU 240 as user input that is encoded and transmitted to an information handling system through a wireless communication channel.

Figure 3A:
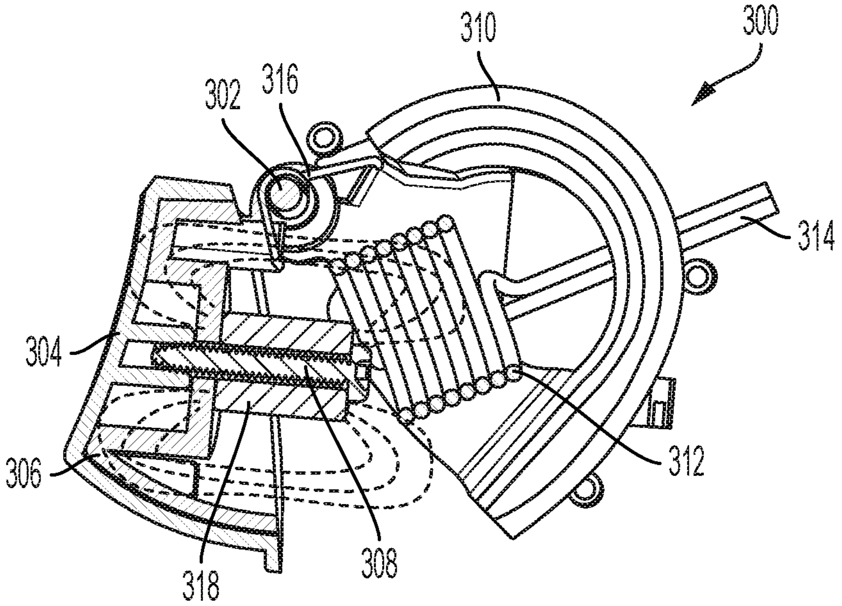
FIG. 3A is a cross-sectional view of an energy harvesting button according to some embodiments of the disclosure.

An example embodiment of a button with energy harvesting capability is shown in FIG. 3A. FIG. 3A is a cross-sectional view of an energy harvesting button according to some embodiments of the disclosure. A button frame 306 defines a shape of the contact area for the button 300. A button cap 304 may cover the frame and improve aesthetics by covering the mechanical mechanism for receiving user input. A screw 308 (e.g., metal or plastic) may attach the button cap 304 to the button frame 306. The screw 308 also attaches a magnet 318 to the button frame 306. A hinge 302 (e.g., a metal or plastic pin) attaches the button frame 306 to a button casing 310. The button casing 310 may be coupled to and/or enclose a wire coil 312. The wire coil 312 may be aligned such that the magnet moves along an arc defined by the hinge 302. The magnet 308 may have a first radius that is smaller than a second radius of the wire coil 312, allowing the magnet to insert, at least partially into the wire coil 312.

Figure 3B:
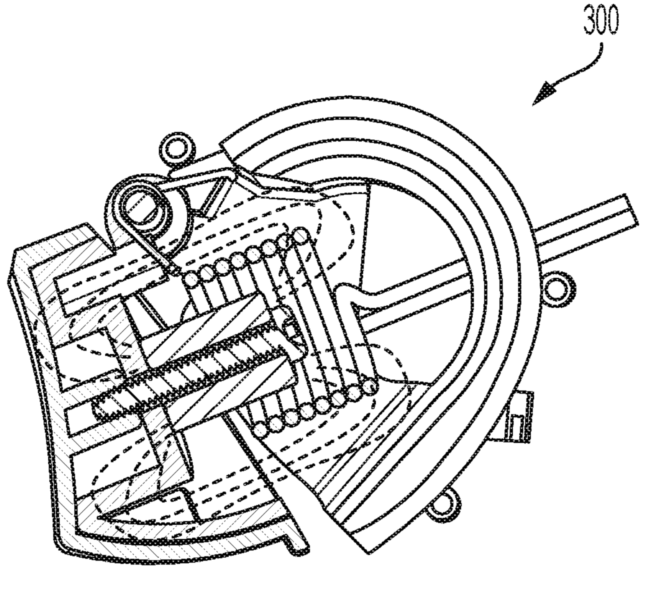
FIG. 3B is a cross-sectional view of a depressed energy harvesting button according to some embodiments of the disclosure.

A user-applied force to the button cap 304 in the configuration of button 300 causes the magnet 308 to enter the wire coil 312 as shown in FIG. 3B. The movement of the magnetic fields across the wire coil 312 causes generation of an electric current in the wire coil 312. The current may be harvested through conductor 314 that couples the wire coil 312 to an energy harvesting circuit. A spring 316 may be attached to the hinge 302 to cause the button cap 304 to return to a default extended position when the user-applied force to the button 300 is released.

Figure 4:
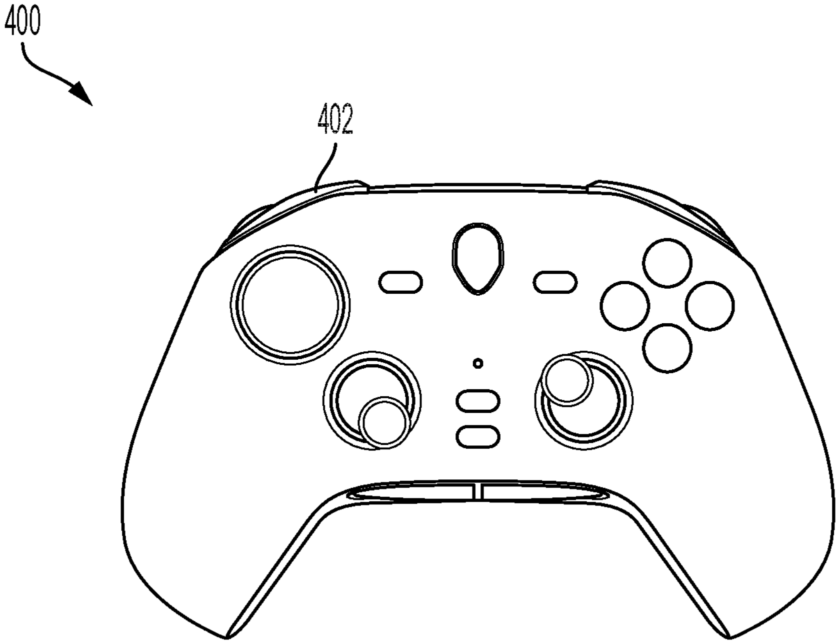
FIG. 4 is a top-down view of a wireless gaming controller with energy harvesting button according to some embodiments of the disclosure.

In one embodiment, the energy harvesting button shown in FIG. 3A may be incorporated into a controller as shown in FIG. 4. FIG. 4 is a top-down view of a wireless gaming controller with energy harvesting button according to some embodiments of the disclosure. A controller 400 may include a trigger button 402 on a top (when the controller is held vertically) or a front (when the controller is held horizontally). The trigger button 402 may include a magnet and wire coil, such as in the configuration of FIG. 3A. The controller 400 may also include energy harvesting circuit, energy storage device, and/or MCU.

The controller 400 may interact with an information handling system, such as to provide user input to the information handling system. The information handling system may be executing an application (e.g., a gaming application) at the request of the user and allow the user to interact with the application through user input to the gaming controller 400 of FIG. 4.

In some embodiments, aspects of a wireless controller described herein may be used to support the execution of gaming applications in different environments. Gaming sessions may execute as a service provided by an information handling system, either locally on a device, on another system on the network, or in the cloud. An entertainment device (e.g., a monitor, a television, a virtual reality headset or other output display) may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a single location (e.g., a household) may include different AV systems. A wireless gaming controller, such as that described according to embodiments of FIG. 4, or other wireless device incorporating an energy harvesting button according to embodiments of FIG. 3A, may improve the ability of a user to interact in a dynamic gaming environment such as a household. The wireless nature allows the user to roam from room to room and switch from one AV output in the household (e.g., a monitor) to another AV output in the household (e.g., a television). This roaming may increase the amount of time a user interacts with the service by allowing the user to change scenery, and the increased battery life provided by the slow charging of the battery from one or more energy harvesting button may allow the user to stay engaged in those different environments for a longer period of time.

Figure 5:
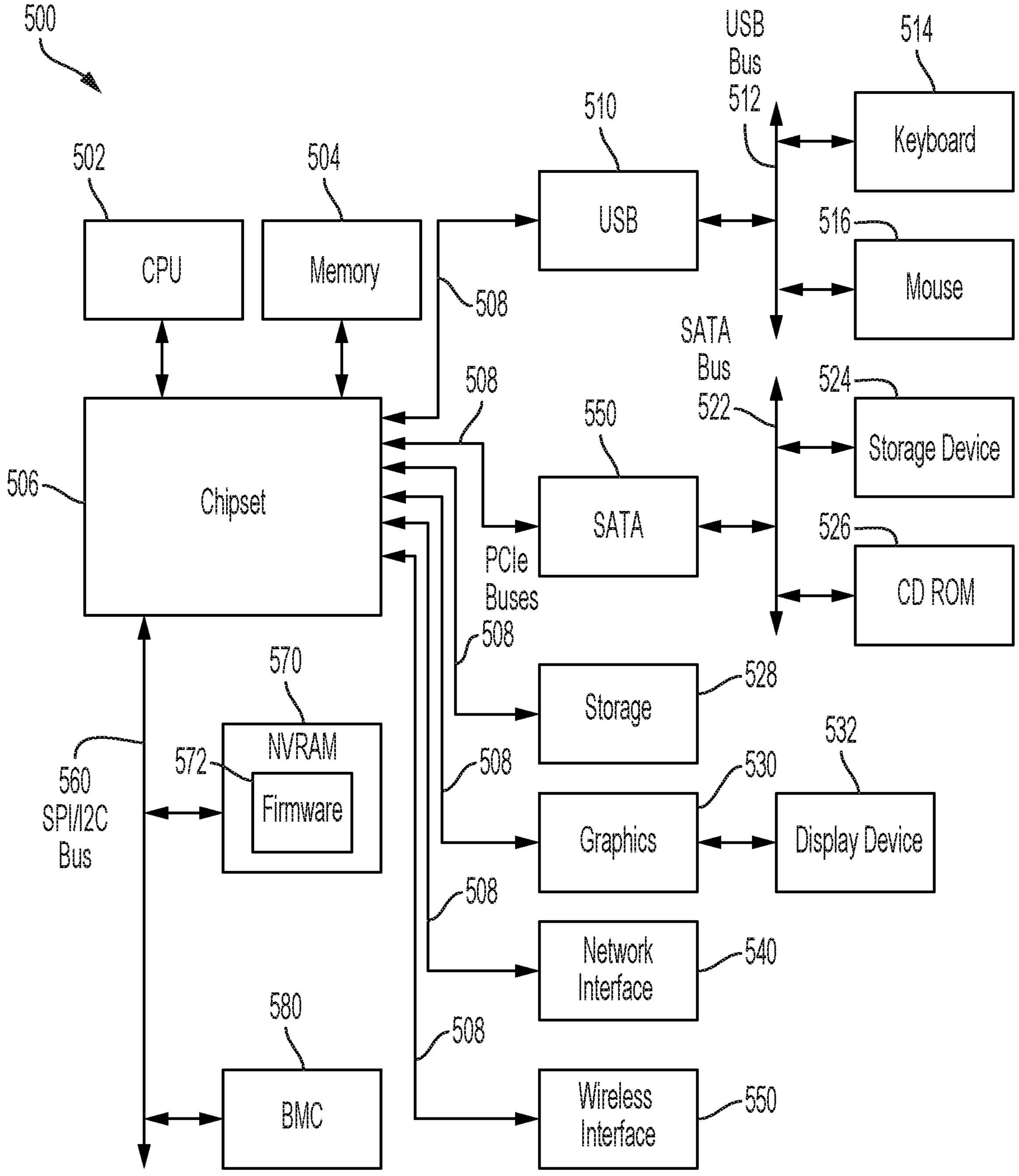
FIG. 5 is a block diagram of an example information handling system according to some embodiments of the disclosure.

FIG. 5 is a block diagram of an information handling system according to some embodiments of the disclosure. Information handling system 500 may include a processor 502 (e.g., a central processing unit (CPU)), a memory (e.g., a dynamic random-access memory (DRAM)) 504, and a chipset 506. In some embodiments, one or more of the processor 502, the memory 504, and the chipset 506 may be included on a motherboard (also referred to as a mainboard), which is a printed circuit board (PCB) with embedded conductors organized as transmission lines between the processor 502, the memory 504, the chipset 506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 502, the memory 504, the chipset 506, and/or other components may be organized as a System on Chip (SoC).

The processor 502 may execute program code by accessing instructions loaded into memory 504 from a storage device, executing the instructions to operate on data also loaded into memory 504 from a storage device, and generate output data that is stored back into memory 504 or sent to another component. The processor 502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 506 may facilitate the transfer of data between the processor 502, the memory 504, and other components. In some embodiments, chipset 506 may include two or more integrated circuits (ICs), such as a northbridge controller coupled to the processor 502, the memory 504, and a southbridge controller, with the southbridge controller coupled to the other components such as USB 510, SATA 520, and PCIe buses 508. The chipset 506 may couple to other components through one or more PCIe buses 508.

Some components may be coupled to one bus line of the PCIe buses 508, whereas some components may be coupled to more than one bus line of the PCIe buses 508. One example component is a universal serial bus (USB) controller 510, which interfaces the chipset 506 to a USB bus 512. A USB bus 512 may couple input/output components such as a keyboard 514 and a mouse 516, but also other components such as USB flash drives, or another information handling system. Another example component is a SATA bus controller 520, which couples the chipset 506 to a SATA bus 522. The SATA bus 522 may facilitate efficient transfer of data between the chipset 506 and components coupled to the chipset 506 and a storage device 524 (e.g., a hard disk drive (HDD) or solid-state disk drive (SDD)) and/or a compact disc read-only memory (CD-ROM) 526. The PCIe bus 508 may also couple the chipset 506 directly to a storage device 528 (e.g., a solid-state disk drive (SDD)). A further example of an example component is a graphics device 530 (e.g., a graphics processing unit (GPU)) for generating output to a display device 532, a network interface controller (NIC) 540, and/or a wireless interface 550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 506 may also be coupled to a serial peripheral interface (SPI) and/or Inter-Integrated Circuit (I2C) bus 560, which couples the chipset 506 to system management components. For example, a non-volatile random-access memory (NVRAM) 570 for storing firmware 572 may be coupled to the bus 560. As another example, a controller, such as a baseboard management controller (BMC) 580, may be coupled to the chipset 506 through the bus 560. BMC 580 may be referred to as a service processor or embedded controller (EC). Capabilities and functions provided by BMC 580 may vary considerably based on the type of information handling system. For example, the term baseboard management system may be used to describe an embedded processor included at a server, while an embedded controller may be found in a consumer-level device. As disclosed herein, BMC 580 represents a processing device different from processor 502, which provides various management functions for information handling system 500. For example, an embedded controller may be responsible for power management, cooling management, and the like. An embedded controller included at a data storage system may be referred to as a storage enclosure processor or a chassis processor.

System 500 may include additional processors that are configured to provide localized or specific control functions, such as a battery management controller. Bus 560 can include one or more busses, including a Serial Peripheral Interface (SPI) bus, an Inter-Integrated Circuit (I2C) bus, a system management bus (SMBUS), a power management bus (PMBUS), or the like. BMC 580 may be configured to provide out-of-band access to devices at information handling system 500. Out-of-band access in the context of the bus 560 may refer to operations performed prior to execution of firmware 572 by processor 502 to initialize operation of system 500.

Firmware 572 may include instructions executable by processor 102 to initialize and test the hardware components of system 500. For example, the instructions may cause the processor 502 to execute a power-on self-test (POST). The instructions may further cause the processor 502 to load a boot loader or an operating system (OS) from a mass storage device. Firmware 572 additionally may provide an abstraction layer for the hardware, such as a consistent way for application programs and operating systems to interact with the keyboard, display, and other input/output devices. When power is first applied to information handling system 500, the system may begin a sequence of initialization procedures, such as a boot procedure or a secure boot procedure. During the initialization sequence, also referred to as a boot sequence, components of system 500 may be configured and enabled for operation and device drivers may be installed. Device drivers may provide an interface through which other components of the system 500 can communicate with a corresponding device. The firmware 572 may include a basic input-output system (BIOS) and/or include a unified extensible firmware interface (UEFI). Firmware 572 may also include one or more firmware modules of the information handling system. Additionally, configuration settings for the firmware 572 and firmware of the information handling system 500 may be stored in the NVRAM 570. NVRAM 570 may, for example, be a non-volatile firmware memory of the information handling system 500.

Information handling system 500 may include additional components and additional busses, not shown for clarity. For example, system 500 may include multiple processor cores (either within processor 502 or separately coupled to the chipset 506 or through the PCIe buses 508), audio devices (such as may be coupled to the chipset 506 through one of the PCIe busses 508), or the like. While a particular arrangement of bus technologies and interconnections is illustrated for the purpose of example, one of skill will appreciate that the techniques disclosed herein are applicable to other system architectures. System 500 may include multiple processors and/or redundant bus controllers. In some embodiments, one or more components may be integrated together in an integrated circuit (IC), which is circuitry built on a common substrate. For example, portions of chipset 506 can be integrated within processor 502. Additional components of information handling system 500 may include one or more storage devices that may store machine-executable code, one or more communications ports for communicating with external devices, and various input and output (I/O) devices, such as a keyboard, a mouse, and a video display.

In some embodiments, processor 502 may include multiple processors, such as multiple processing cores for parallel processing by the information handling system 500. For example, the information handling system 500 may include a server comprising multiple processors for parallel processing. In some embodiments, the information handling system 500 may support virtual machine (VM) operation, with multiple virtualized instances of one or more operating systems executed in parallel by the information handling system 500. For example, resources, such as processors or processing cores of the information handling system may be assigned to multiple containerized instances of one or more operating systems of the information handling system 500 executed in parallel. A container may, for example, be a virtual machine executed by the information handling system 500 for execution of an instance of an operating system by the information handling system 500. Thus, for example, multiple users may remotely connect to the information handling system 500, such as in a cloud computing configuration, to utilize resources of the information handling system 500, such as memory, processors, and other hardware, firmware, and software capabilities of the information handling system 500. Parallel execution of multiple containers by the information handling system 500 may allow the information handling system 500 to execute tasks for multiple users in parallel secure virtual environments.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. An apparatus, comprising:

a casing comprising a wire coil having a radius of a first value;

a button frame comprising a magnet having a radius of a second value smaller than the first value;

a button cap attached to the button frame, the button cap comprising a contact surface for a trigger button; and a hinge attaching the button frame to the casing such that the magnet moves at least partially within the wire coil, wherein the hinge is configured to move the magnet along an arc defined by the hinge in response to a force applied to the button cap, wherein the arc includes at least a first portion that extends within the wire coil and a second portion that extends outside the wire coil, wherein the hinge is configured to convert the force applied to movement of the magnet along the arc defined by the hinge to generate a current in the wire coil, wherein the hinge comprises a metal pin that extends through the button frame and the casing, the metal pin defining a single fixed pivot point about which the button frame rotates relative to the casing, and wherein the single fixed pivot point constrains movement of the magnet to the arc defined by the hinge.

2. The apparatus of claim 1, wherein the button frame is attached to the casing such that motion of the button frame causes the magnet to generate a current in the wire coil.

3. The apparatus of claim 1, further comprising a screw that secures the button frame to the button cap.

4. The apparatus of claim 1, further comprising a spring coupled to the metal pin and configured to return the button cap to an extended position after application of a force to the button cap causes the button cap to move to a depressed position.

5. The apparatus of claim 1, further comprising an energy storage device coupled to the wire coil.

6. The apparatus of claim 5, further comprising an energy harvesting circuit coupled to the wire coil and to the energy storage device.

7. The apparatus of claim 5, further comprising: a pressure-activated switch activated by depression of the button frame; and logic circuitry coupled to the pressure-activated switch to process user input, wherein the logic circuitry is coupled to the energy storage device.

8. A gaming controller comprising:

a controller casing comprising an opening; and a user-activated button extending through the opening, the user-activated button comprising:

a casing comprising a wire coil having a radius of a first value;

a button frame comprising a magnet having a radius of a second value smaller than the first value;

a button cap attached to the button frame, the button cap comprising a contact surface for a trigger button; and a hinge attaching the button frame to the casing such that the magnet moves at least partially within the wire coil, wherein the hinge is configured to move the magnet along an arc defined by the hinge in response to a force applied to the button cap, wherein the arc includes at least a first portion that extends within the wire coil and a second portion that extends outside the wire coil, wherein the hinge is configured to convert the force applied to movement of the magnet along the arc defined by the hinge to generate a current in the wire coil, wherein the hinge comprises a metal pin that extends through the button frame and the casing, the metal pin defining a single fixed pivot point about which the button frame rotates relative to the casing, and wherein the single fixed pivot point constrains movement of the magnet to the arc defined by the hinge.

9. The gaming controller of claim 8, further comprising a spring coupled to the metal pin and configured to return the button cap to an extended position after application of a force to the button cap causes the button cap to move to a depressed position.

10. The gaming controller of claim 9, further comprising an energy storage device coupled to the wire coil.

11. The gaming controller of claim 10, further comprising an energy harvesting circuit coupled to the wire coil and to the energy storage device.

12. A method, comprising:

receiving a user-applied force to a user-activated trigger button that causes a magnet attached to a button frame to move at least partially within a wire coil of a casing of the user-activated trigger button to cause generation of an electric current in the wire coil, wherein receiving the user-applied force causes the magnet to move along an arc defined by a hinge, wherein the arc includes at least a first portion that extends within the wire coil and a second portion that extends outside the wire coil, wherein the hinge comprises a metal pin that extends through the button frame and the casing, the metal pin defining a single fixed pivot point about which the button frame rotates relative to the casing, and wherein the single fixed pivot point constrains movement of the magnet to the arc defined by the hinge; and storing energy in an energy storage device based on the electric current in the wire coil.

13. The method of claim 12, further comprising conditioning the electric current before storing the energy in the energy storage device.

* * * * *